April 28, 1970      W. E. TAYLOR      3,508,482
HANDLE AND BATTERY COMPARTMENT FOR PHOTOGRAPHIC APPARATUS
Filed Oct. 30, 1967      2 Sheets-Sheet 1
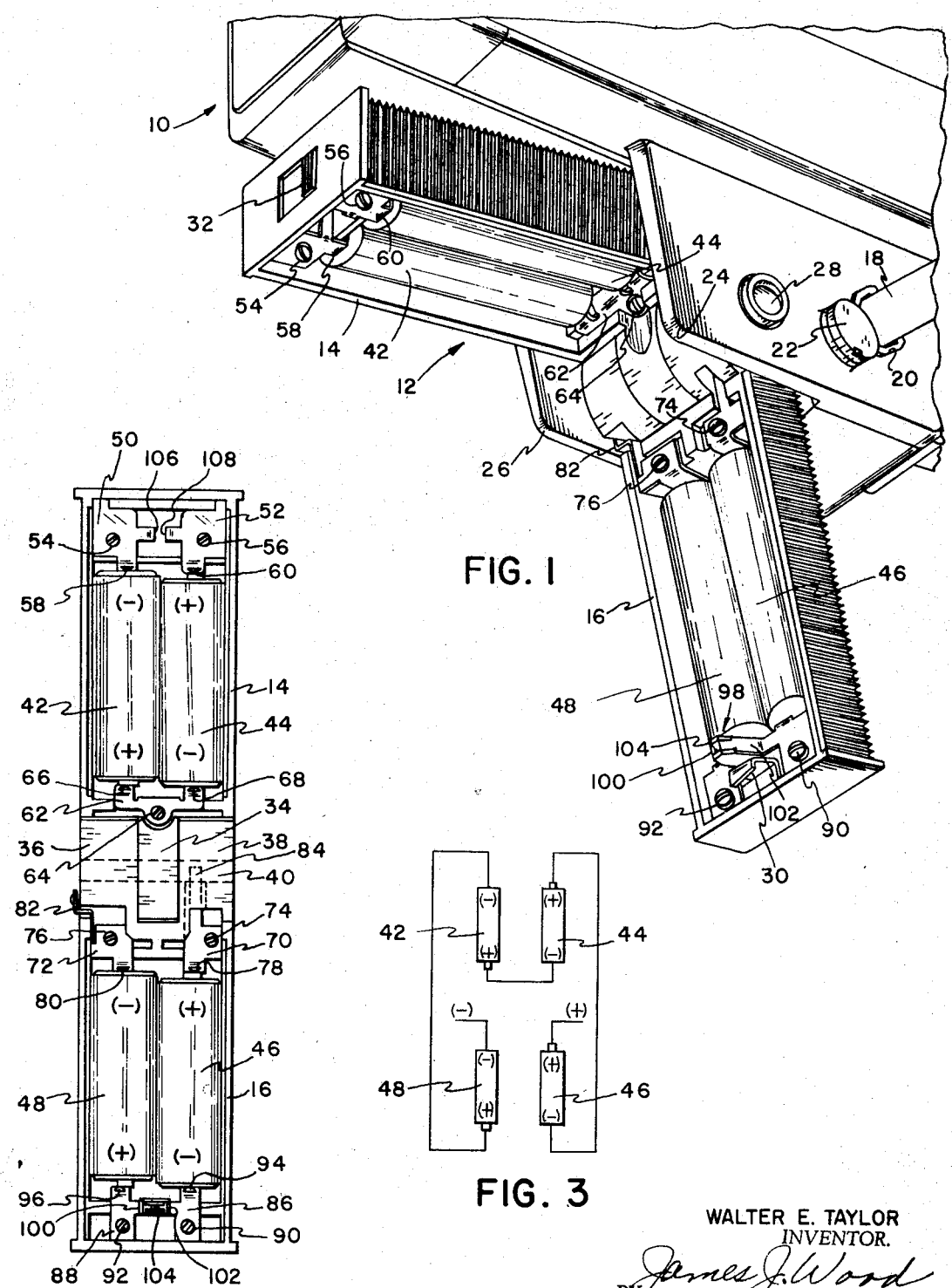
WALTER E. TAYLOR
INVENTOR.
BY James J. Wood
Robert W. Hampton
ATTORNEYS April 28, 1970 W. E. TAYLOR 3,508,482
HANDLE AND BATTERY COMPARTMENT FOR PHOTOGRAPHIC APPARATUS
Filed Oct. 30, 1967
2 Sheets-Sheet 2

WALTER E. TAYLOR
INVENTOR.

BY *James J. Wood*
*Robert W. Hampton*
ATTORNEYS

United States Patent Office

3,508,482
Patented Apr. 28, 1970

3,508,482
HANDLE AND BATTERY COMPARTMENT FOR PHOTOGRAPHIC APPARATUS
Walter E. Taylor, Greece, N.Y., assignor to Eastman Kodak Company, Rochester, N.Y., a corporation of New Jersey
Filed Oct. 30, 1967, Ser. No. 678,982
Int. Cl. G03b 17/00
U.S. Cl. 95—86                              6 Claims

ABSTRACT OF THE DISCLOSURE

A handle and battery compartment for photographic apparatus is disclosed in which the electrical energy source is provided by a plurality of electric cells conveniently located within the interior. The compartment is rotatably supported on the apparatus body, and serve conveniently as a handgrip to enable the photographic apparatus to be aimed in a desired direction.

CROSS REFERENCES TO RELATED APPLICATIONS

Reference is made to commonly assigned, copending U.S. patent application Ser. No. 678,981, entitled "Locking Arrangement for Photographic Apparatus," filed in the name of George W. O'Gara, on Oct. 30, 1967, and now U.S. Patent No. 3,459,064.

BACKGROUND OF THE INVENTION

Field of the invention

This invention relates to a handle and battery compartment for a motion picture camera, although it may be utilized with equal facility for photographic projection apparatus or the like.

Description of the prior art

It is old in the art to provide electric cells for a motion picture camera. Invention here, however, resides in a handle and battery compartment which satiates dual functions, by providing a depository, the interior of which is readily accessible to the operator for insertion or replacement of electric cells, in addition to serving as a convenient handgrip.

SUMMARY OF THE INVENTION

The instant invention relates to a handle and battery compartment for an electrically operated motion picture camera in which the electric cell sources are conveniently located in said compartment which may readily be opened to insert or replace these electric cells, and in addition, can be closed to provide duality of function, the closed compartment serving as a handgrip for the camera operator.

The novel features which are believed to be characteristic of the invention are set forth with particularity in the appended claims. The invention itself, however, both as to its organization and method of operation, together with objects and advantages thereof, may best be understood by reference to the following description, considered in connection with the accompanying drawings.

BRIEF DESCRIPTION OF THE DRAWINGS

FIG. 1 is a partial pictorial view of a battery powered motion picture camera, showing the handle and battery compartment of this invention, in a partly open position;

FIG. 2 is a top plan view showing the handle and battery compartment removed from the motion picture camera and fully extended;

FIG. 3 is an electrical schematic showing the series connections for a plurality of electric cells;

DESCRIPTION OF THE PREFERRED EMBODIMENT

Figure 4:
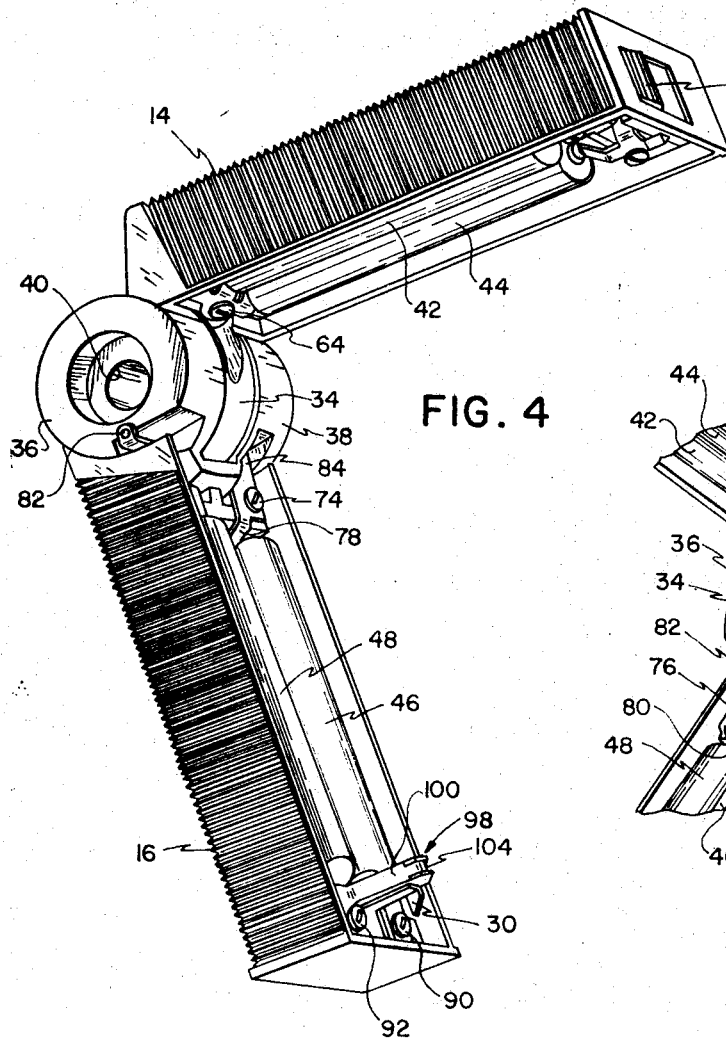
FIG. 4 is a pictorial view of the handle and battery compartment in accordance with the invention, depicting various details including one of the external terminals for the electrical energy source.

The handle and battery compartment of this invention is illustrated as part of an electric battery powered motion picture camera. Referring now particularly to FIGS. 1, 2, and 3, the main body portion of the motion picture camera is indicated generally at 10. Only so much of the main body portion is shown in FIG. 1, as will enable an understanding of this invention, although it will, of course, be understood that the main body portion includes all the usual components of the conventional movie camera. A handle and battery compartment is indicated generally at 12. The compartment 12 comprises mating section members 14, 16 which are shown in the open position in FIG. 1. The movie camera is arranged so that the member 16 may be locked with the member 14, the locked unit being rotatable into two locked positions. As viewed in FIG. 1, the handle compartment 12 assumes a locked horizontal position when member 16 is rotated into locking engagement with member 14. In this closed position, the camera will be in the normal carrying position, so that it forms a unitary assembly in the general shape of a rectangular solid and may be conveniently carried by a strap 18, the strap being adapted to be fitted on a bracket frame 20 which is supported on a screw member 22. The main camera body 10 includes depending cover walls 24, 26, which define in part a well or recess (unnumbered) within which the handle and battery compartment 12 may be rotatably hinged, as will shortly be explained.

A detent button indicated at 28 enables the handle and battery compartment 12 to be adjustably rotated into one of two locked positions within the well afforded by the walls 24, 26. The details concerning the locking arrangement are described and claimed in the copending U.S. patent application, Ser. No. 678,9817, entitled "Locking Arrangement for Photographic Apparatus," filed in the name of George O'Gara on Oct. 30, 1967, and now U.S. Patent No. 3,459,064. As viewed in FIG. 1, when the detent button 28 is depressed, the members 14, 16 may be rotated into locking engagement, locking being accomplished by means of the cooperation of the latch member 30, engaging a similar cooperating locking member controlled by the button 32. In order to open the handle and battery compartment 12, the release button 32 is displaced laterally to release the latch 30. In this manner, with the compartment in the open position shown in FIG. 1, electric cells may readily be inserted or be replaced as required.

With the handle and battery compartment 12 in the closed or locked position, the arcuate position of the handgrip 12 may be altered by means of the detent button 28.

Figure 6:
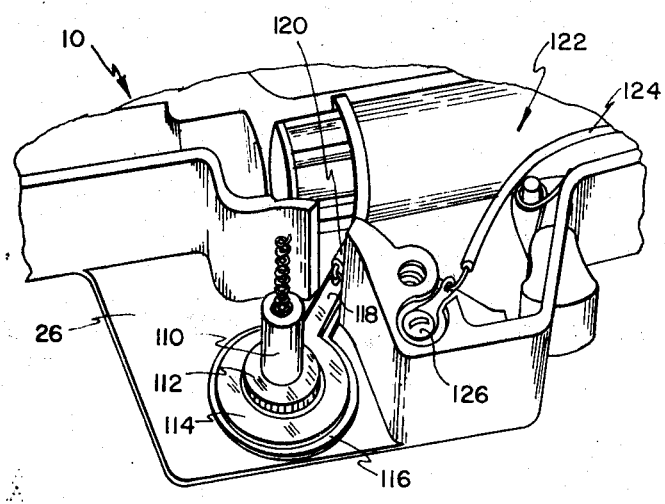
FIG. 6 is a partial pictorial view of the motion picture camera with the handle and battery compartment removed, depicting further details of the electrical connections to the electrical motor.

As shown in FIG. 2, the handgrip 12 has been removed from the camera body proper and is shown in an extended top plan view, in order to provide an interior view of the connections between the electric cells. The section 14 is molded to provide a depending part 34 which is adapted to fit within the bosses 36, 38 protruding from section member 16. The parts 34, 36, 38 are internally recessed so that when they are in operating position, they provide a recess or aperture at 40 for receiving a shaft 110 (FIG. 6).

The section members 14 and 16 are internally recessed to provide first and second chambers to receive dry cells 42, 44, 46, and 48 respectively. The electric cells may be connected in parallel, series, or series-parallel combinations to provide the voltage and current capacity to satisfy the requirements of the electric motor selected. The dry cells 42, 44, 46, and 48 are here illustrated as electrically arranged in series. In order to insure this aiding relationship, provision is made so that the respective dry cells are electrically connected to or insulated from each other in accordance with the schematic shown in FIG. 3. In order to accomplish this, member 14 is internally recessed by a molding process to receive metallic plates 50 and 52, which are secured to the member 14 by self-tapping screws 54, 56, respectively, which are screwed into appropriately molded holes in insulating member 14. It will be observed from a study of FIG. 2, that in the open position of the handle and battery compartment 12, the conductive plates 50, 52 include extended elements 106, 108 which in the position shown are insulated from each other by an air space. The plates 50, 52 are also suitably shaped to provide contacts at 58, 60 for engagement with the appropriate terminals on dry cells 42, 44 respectively.

In the illustrated embodiment of this invention, contact 58 makes electrical contact with the bottom (—terminal) of dry cell 42 and contact 60 makes contact with the +terminal of dry cell 44.

A metal plate member 62, suitably supported in a recess in insulating section member 14 and secured thereto by a screw 64, provides common electrical connection between the electric cells 42, 44, by means of terminal contacts at 66, 68, respectively.

Figure 5:
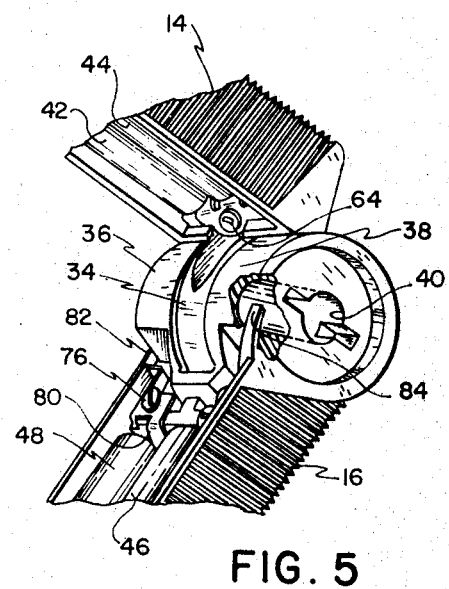
FIG. 5 is a partial pictorial view of the handle and battery compartment in accordance with the invention, depicting various details including the other terminal of the electrical energy source.

Electrical connections for the electric cells 46, 48 are provided by means of metallic conductive plates 70, 72 which are positioned in a suitable recess in the section member 16 and are secured thereto by screws 74, 76, respectively. As will be seen from a study of FIG. 2, the conductive plates 70, 72 are electrically isolated from each other by an air space, as well as the synthetic resin which forms the insulating material for the section member 16. Direct electrical connection for the electric cells 46, 48 is provided by means of the terminal contacts 78 and 80, respectively. The conductive plate 72 provides an external terminal for the battery array by means of a projection 82, depending therefrom, which extends out (as best shown in FIGS. 2 and 4) beyond the body proper of the handle and battery compartment 12. The conductive plate 70 includes a finger-like resilient conductive member 84 which extends into the aperture 40 (FIGS. 2, 5). The member 16 also includes conductive plates 86, 88 positioned in suitable recesses therein and secured thereto by means of screws 90, 92 respectively. The conductive plates 86, 88 are also shaped or adapted to provide electrical contacts at 94, 96 for the dry cells 46, 48 respectively. Insulating member 16 also includes an interconnecting post indicated generally at 98 (FIG. 1). Post 98 may be integrally molded with member 16 to provide insulating post 104, adapted to receive conductive extensions 100 and 102, which may be integral parts of conductive plate members 88 and 86 respectively. Thus the conductive extensions 100 and 102 are separated from each other by the insulation afforded by post member 104.

As will be observed from the description which has been given so far, the arrangement of FIG. 2 effectively provides the electrical realization of the schematic shown in FIG. 3. Briefly, to review, when the section members 14, 16 are in the closed position, the dry cells 42, 44 are electrically connected to each other by means of the conductive plate 62. When sections 14 and 16 of the handle and battery compartment 12 are in the closed position, the negative terminal of dry cell 42 is connected to the positive terminal of dry cell 48 by means of plate 100 of interconnecting post 98, the plate 100 in closed position, making electrical contact with the plate 50 by means of extension 106. Electrical isolation of plate 50 from plate 52 is provided by means of insulating post 104. The positive terminal of dry cell 44 is connected to the negative terminal of dry cell 46 by means of conductive extension 102, which makes contact with plate 52 in the closed position by means of extension 108, electrical isolation between plate 50 and 52 being afforded by insulating post 104, as previously explained. In the closed or active position, the negative terminal for the energy source is at 82 and the positive terminal is at 84.

Completing the description and referring now to FIG. 6 in particular, a shaft 110 is pressed into a boss 112 on the camera body, the shaft 110 fitting into aperture 40 to rotatively support the handle and battery compartment 12 thereon. A washer type sliding contact member is provided at 114, the sliding contact 114 being insulated from the wall 26 by means of an insulation member 116 of suitable material which may be vulcanized fiber paper. The conductor 114 has a tab end at 118 to which is fixedly secured a wire 120 which is connected to the negative terminal (not shown) of the electric motor indicated generally at 122. A wire 124 is fixedly secured to the camera body 10 by means of a screw 126, the wire being connected to the positive terminal (not shown) of the electric motor 122.

In either the closed or extended position, during operation, the negative terminal projection 82 (FIGS. 2 and 4) presses against the sliding contact 114 to provide negative potential to the motor 122 through the wire 120. The finger member 84, which forms the positive terminal of the battery, makes contact with the shaft 110 (FIG. 6) and since the shaft 110 is rigidly secured or electrically common with the camera body 10, there is provided electrical connection to the positive terminal of the electric motor 122. A suitable arrangement (not shown on the drawing) provides electrical switching means to suitably interrupt or connect the electrical energy to the terminals of motor 122.

As explained more fully in the copending application of George O'Gara supra, now U.S. Patent No. 3,459,064, the compartment 12 may be rotated to a locked position approximately 100° from the horizontal or closed position described in connection with FIG. 1 to provide a convenient handgrip for the movie camera operator.

The motion picture camera of the instant invention is a portable unit designed to be self-powered by means of a plurality of electric cells. The user has merely to operate the latch button 32 to open the compartment 12 into the extended position, as shown in FIG. 1 and insert the dry cells, observing the correct polarities to provide the voltage and current capacity required. In the practical embodiment here illustrated, it is intended that the dry cells be of Type AA, having approximately 1½ volts per cell, so as to provide a total of 6 volts to operate the electric motor 122.

The invention has been described in detail with particular reference to preferred embodiments thereof, but it will be understood that variations and modifications can be effected within the spirit and scope of the invention.

I claim:

1. In a handle to be held by a hand and having therein a battery compartment for containing a plurality of electric cells to provide a source of electrical energy for a photographic apparatus, the improvement comprising:
    (a) an insulating member externally contoured to complement the hand and defining an internal recess to receive the plurality of electric cells, said insulating member including half sections adapted to be at least partially separated to permit insertion of the electric cells;
    (b) electrical contact means in said internal recess for connecting the electric cells in a predetermined electrical relationship; and (c) a pair of terminal members for providing external connections of opposite polarity to the source of electrical energy.

2. In a handle to be held by a hand and having therein a battery compartment for containing a plurality of electric cells to provide a source of electrical energy for a photographic apparatus, the improvement comprising:
(a) an insulating member externally contoured to complement the hand and defining an internal recess to receive the plurality of electric cells, said insulating member including half sections adapted to be at least partially separated to permit insertion of the electric cells;
(b) electrical contact means in said internal recess for connecting the electric cells in a series electrical relationship; and
(c) a pair of terminal members for providing external connections of opposite polarity to the source of electrical energy.

3. In a handle to be held by a hand and having therein a battery compartment for containing a plurality of electric cells to provide a source of electrical energy for a photographic apparatus, the improvement comprising:
(a) an insulating member externally contoured to complement the hand and internally hollowed out to define a cavity for receiving the plurality of electric cells, and insulating member including first and second half sections adapted to be moved one relative to the other form an open position for insertion of the electric cells to a closed position, said half sections defining an aperture through which said insulating member can be rotatably supported on the photographic apparatus;
(b) electrical contact means in said cavity for connecting the electric cells in a series electrical relationship, said electrical contact means including first and second contact pairs supported by said half sections respectively and connected to each other electrically only when said half sections are in said closed position, said electrical contact means further including a third contact pair permanently interconnected electrically; and
(c) a pair of terminal members cooperatively associated with said electrical contact means for providing external connections of opposite polarity to the source of electrical energy.

4. In a handle to be held by a hand and having therein a battery compartment for containing a plurality of electric cells to provide a source of electrical energy for a photographic apparatus that includes a supporting member and conductive means in proximity to but insulated from the supporting member, the improvement comprising:
(a) an insulating member externally contoured to complement the hand and hollowed out to define a cavity for receiving the plurality of electric cells, said insulating member including first and second half sections adapted to be moved one relative to the other from an open position for insertion of the electric cells to a closed position, said half sections defining an aperture through which said insulating member can be supported by the supporting member of the photographic apparatus;
(b) electrical contact means in said half sections for connecting the electric cells in a series electrical relationship only when said half sections are in said closed position;
(c) first terminal means connected to said electrical contact means and extending outside of said insulating member to provide contact with the conductive means of the photographic apparatus; and
(d) second terminal means connected to said electrical contact means and extending into said aperture to provide contact with the supporting member of the photographic apparatus;
(e) whereby, when said insulating member is supported by the supporting member of the photographic apparatus through said aperture, said first terminal means is in contact with the conductive means of the photographic apparatus and said second terminal means is in contact with the supporting member of the photographic apparatus so that, when the electric cells are in said cavity and said half sections are in said closed position, the source of electrical energy is provided for the photographic apparatus.

5. In a handle to be held by a hand and having therein a battery compartment for containing a plurality of dry cells, each having a first pole of one polarity and a second pole of opposite polarity, to provide a source of electrical energy for a photographic apparatus having a supporting member, the improvement comprising:
(a) an insulating member externally contoured to complement the hand and having an aperture through which said insulating member can be supported by the supporting member of the photographic apparatus, said insulating member having first and second closure sections defining a chamber for receiving the plurality of dry cells, said closure sections being movable relative to each other from an open position permitting insertion of the dry cells to a closed position enclosing the inserted cells;
(b) cell holding means on each of said closure sections for holding the inserted cells in predetermined orientation;
(c) conductive means on said first closure section for electrically connecting the first pole of one of the cells thereon to the second pole of another of the cells thereon;
(d) first terminal means on said second closure section for electrically connecting the first pole of one of the cells thereon to the photographic apparatus, said first terminal means extending into said aperture to make contact with the supporting member of the photographic apparatus;
(e) second terminal means on said second closure section for electrically connecting the second pole of another of the cells thereon to the photographic apparatus, said second terminal means extending outside of said second closure section; and
(f) connecting means on said closure sections for electrically connecting the cells on said first closure section to the cells on said second closure section in a series aiding relationship when said closure sections are in said closed position;
(g) whereby, when said insulating member is supported by the supporting member of the photographic apparatus through said aperture, when the plurality of dry cells are in said chamber, and when said closure sections are in said closed position, said first and second terminal means make the source of electrical energy available to the photographic apparatus.

6. In a handle to be held by a hand and having therein a battery compartment for containing a plurality of dry cells, each having a first pole of one polarity and a second pole of opposite polarity, to provide a source of electrical energy for a photographic apparatus, the improvement comprising:
(a) first and second matable insulating members, each adated to receive thereon at least two of the plurality of dry cells, one of said insulating members being movable into a mated relationship with the other to enclose the received cells, said insulating members being externally contoured to complement the hand when in said mated relationship;
(b) latching means on said insulating members for holding said insulating members in said mated relationship;
(c) a contact member on said first insulating member for electrically connecting the first pole of one of the cells thereon to the second pole of another of the cells thereon;

(d) first and second terminal members on said second insulating member for electrically connecting, respectively, the first pole of one of the cells thereon and the second pole of another of the cells thereon to the photographic apparatus;

(e) first and second contacts on said first insulating member for establishing electrical contact, respectively, with the second pole of said one cell thereon and the first pole of said another cell thereon;

(f) first and second contacts on said second insulating member for establishing electrical contact, respectively, with the first pole of said another cell thereon and the second pole of said one cell thereon; and (g) connecting means on said insulating members for electrically connecting said first contact on said first insulating member to said first contact on said second insulating member and for electrically connecting said second contact on said first insulating member to said second contact on said second insulating member when said insulating members are in said mated relationship;

(h) whereby, when said at least two of the plurality of dry cells are on each of said insulating members and when said insulating members are in said mated relationship, said plurality of cells are electrically connected in a series aiding relationship to avail the source of electrical energy provided thereby to the photographic apparatus through said terminal members.

References Cited

UNITED STATES PATENTS 3,301,627   1/1967   Kimura _____ 95—86

JOHN M. HORAN, Primary Examiner

U.S. Cl. X.R.

352—243

PO-1050 (5/69)

UNITED STATES PATENT OFFICE
CERTIFICATE OF CORRECTION

Patent No. 3,508,482          Dated May 21, 1970

Inventor(s) Walter E. Taylor

It is certified that error appears in the above-identified patent and that said Letters Patent are hereby corrected as shown below:

Column 2, line 48, "Serial No. 678,9817" should be -- 678,981 --

Column 5, line 27, "and" (first occurrence) should be -- said --

SIGNED AND SEALED
AUG 18 1970

(SEAL)
Attest:

Edward M. Fletcher, Jr.
Attesting Officer

WILLIAM E. SCHUYLER, JR.
Commissioner of Patents